Reissued Apr. 14, 1942 Re. 22,074

UNITED STATES PATENT OFFICE 22,074

METHOD OF PRODUCING A HARD METAL ALLOY

Paul Schwarzkopf, Yonkers, N. Y., assignor to American Cutting Alloys, Inc., New York, N. Y., a corporation of Delaware No Drawing. Original No. 2,170,433, dated August 22, 1939, Serial No. 164,166, September 16, 1937. Reissue No. 21,731, dated February 25, 1941, Serial No. 351,639, August 6, 1940. This application for reissue August 19, 1941, Serial No. 407,506. In Germany May 16, 1929

8 Claims. (Cl. 75—137)

This invention refers to a method of producing a hard metal tool alloy.

This invention forms a continuation in part of my copending application Ser. No. 727,781, filed May 26, 1934, and of my copending application Ser. No. 743,717, filed September 12, 1934 and issued into Patent No. 2,122,157, which were in turn copending with my application Ser. No. 656,103, filed February 10, 1933 and issued into Patent No. 1,959,879, and my application Ser. No. 625,042, filed July 27, 1932 and issued into Patent No. 2,091,017, which were in turn copending with my application Ser. No. 452,132, filed May 13, 1930, and I of course do not claim herein anything which is subject matter of the claims in my above mentioned earlier patents.

It is an object of the invention to increase the hardness of such hard metal tool alloys without impairing their toughness.

It is another object of the invention to increase the resistance of such hard metal tool alloys against mechanical wear and chemical effects such as of the oxygen of the surrounding air, or moisture, or a cooling liquid such as water.

It is another object of the invention to adjust the heat conductivity of the hard metal tool alloy without impairing its hardness or resistance against oxidation.

It is still another object of the invention to increase the speed at which hard alloys of this kind can be used for cutting, drilling, milling, and other machining purposes.

This and other objects of the invention will be more clearly understood when the specification proceeds.

Hard metal tool alloys have been made of tungsten carbide and auxiliary metal taken substantially from the iron group, in amounts from about 3% to 20%. The tungsten carbide has been finely powdered and mixed with the auxiliary metal, and the mixture heated to sintering temperature. Such hard metal tool alloys could be utilized for machining cast iron but do not prove efficient in high speed machining of steel and other long chips forming compositions of metal.

In contradistinction hereto the invention proceeds from fundamentally new considerations. It no longer uses one carbide alone, viz. tungsten carbide, and cements it by auxiliary metal in the heat.

The present invention particularly refers to a method of producing a hard metal composition, comprising a consolidated product consisting substantially of about 3% to 22% auxiliary metal essentially of the iron group, and carbide of at least two different elements, such as tungsten, molybdenum (i. e. an element of the sixth group of the periodic system), boron (i. e. an element of the third group of the periodic system), titanium (i. e. an element of the fourth group of the periodic system) and vanadium (i. e. an element of the fifth group of the periodic system) and in general of hard carbide of at least two different elements other than carbon selected from the third through sixth groups of the periodic system. The invention includes the steps of comminuting, preferably as finely as possible, at least two hard carbides selected from carbides of different elements of the third through sixth groups of the periodic system, admixing the selected carbides in substantial amounts, including a minimum of 1% of a selected carbide, with auxiliary metal essentially of the iron group in amounts of about 3% to 22%, shaping and preferably pressing the mixture and finally alloying it by sintering it into a hard and tough body and until in substantial amount solid solutions or homogeneous carbide crystal structures are formed therein, each of which contains atoms of two (or more) selected elements capable of forming such structures, in addition to atoms of carbon required to form carbide with those elements. Such carbide solutions exhibit properties which are very desirable particularly in tool materials.

Experiments have shown and science has given the rule that the hardness of solid solutions of elements exceeds that of the solvent element and is a function of their proportion, and that this function possesses a maximum. Plotting in a graph the hardness of the solid solution of two metals against their concentration in solid solution, it generally appears that the hardness increases with the concentration to a flat maximum, of the hardness-composition graph, and if the solid solubility is in excess of the equiatomic ratio of the component metals, the flat maximum occurs within a range of 5% to 10% on either side of this ratio. (Kurnakow and Zemczuzny, "Zeitschrift für anorganische Chemie" 1908, volume 60, page 1, and 1910 volume 68, page 123; the standard textbook of Reinglass "Chemische Technologie der Legierungen", second edition, pages 52, 53; Jeffries and Archer, "The Science of Metals", 1924, pages 254 ff.; and M. v. Schwarz, "Metall- und Legierungskunde," second edition (1929), page 49).

It is particularly advantageous to choose for use in the present invention homogeneous carbide crystal structures as defined above exhibiting approximately maximum hardness and thereby increase the overall or average hardness of the composition.

For illustration of the analogous application to carbide crystal substances of the above rules pertaining to approximate greatest hardness of solid solutions of two elements or metal substances let me take an alloy comprising 10% auxiliary metal and therefore 90% carbide substance. Let me further assume that tungsten-carbide and titanium-carbide are to be compounded to form the theoretically hardest solid solution. Then we have to divide these 90% in the equi-molecular ratio of 60: 196 of the component carbide compounds TiC and WC (which corresponds to the equi-atomic ratio of elements in solid solution), and we have to take about 20% (by weight) titanium-carbide, about 70% tungsten-carbide and about 10% auxiliary metal.

Hard metal of the above composition particularly exhibits high resistance against oxidation at elevated temperature, great hardness and relatively low specific weight.

In the above example, 10% auxiliary metal are chosen only for sake of simplicity. But the amount of auxiliary metal taken essentially, i. e. completely or almost completely, from the iron group (nickel, cobalt, iron) singly or in suitable mixture, may vary between about 3% to 22%. The amount may be smaller if heavy mixtures of carbides (e. g. tungsten-, molybdenum carbide) are concerned and larger if lighter mixtures of carbides (e. g. with titanium carbide) are concerned.

Other compositions the overall or average hardness of which is increased by compounding the carbides substantially or entirely into solid solutions are for instance the following: 50% to 70% titanium carbide, 45% to 25% vanadium carbide, 5% to 25% auxiliary metal; 60% to 40% titanium carbide, 55% to 35% boron carbide, 5% to 25% auxiliary metal; 10% to 25% titanium carbide, 75% to 55% tungsten carbide, 5% to 20% auxiliary metal; 35% to 60% tantalum carbide, 35% to 60% tungsten carbide, 5% to 20% auxiliary metal; 70% to 90% tantalum carbide, 5% to 25% vanadium carbide, 5% to 20% auxiliary metal; 65% to 85% tantalum carbide, 10% to 30% columbium carbide, 5% to 20% auxiliary metal; 25% to 40% vanadium carbide, 55% to 70% columbium carbide, 5% to 20% auxiliary metal.

For special purposes, e. g. for finest cuts or polishing, mixtures of titanium carbide and molybdenum carbide in about equal proportions forming substantially homogeneous carbide crystal structures or solid solutions and nickel up to 9% and 15% and chromium up to 1% and 2% as auxiliary metals has been proven advantageous.

If solid solutions of more than two carbides are to be contained in the composition, one proceeds with advantage in such a way that first at least two groups of binary solid solutions are formed, each group comprising different carbides, whereupon these groups are combined into ternary or quaternary solid solutions by sintering in the presence of the auxiliary metal. Those groups of solid solution are preferably formed before addition of substantial amounts of auxiliary metal.

It is satisfactory for the invention if only substantial amounts of homogeneous carbide crystal structures or solid solutions are produced. According to experience already about 10% of the hard metal alloy formed by those structures are capable to considerably improve the properties of the hard metal. Auxiliary metal may be present in amounts of from about 3% to 25% and essentially, i. e. completely or almost completely taken from the iron group. The auxiliary metals are believed to increase the toughness of the alloy or tool material produced, and act as sintering-aid during sintering and in the completed body as metal cement.

It is quite difficult to mention any minimum amount of carbide of a selected element to be present, because 5% titanium-carbide occupies a space four times as large as 5% by weight of tungsten-carbide. Nevertheless, the minimum amount of carbide to be present and forming part of homogeneous carbide crystal structures or solid solutions has to be substantial, and as a minimum, about 1% by weight of the alloy.

The carbides produced are, if needed, powdered and intimately and uniformly mixed with the chosen auxiliary metal or metals. The mixtures are then preformed by pressing in suitable moulds to a shape similar to the desired shape. The shrinking which takes place during the following treatment must be taken into calculation.

An electric furnace can be employed for effecting the heating and sintering; the sintering may also be carried out by means of high frequency currents. In some cases particularly good results are obtained by carrying out the heating or sintering in a vacuum.

The temperature of the body is to be elevated to about 1400° to 1600° C. and this heat-treatment is to be continued for about one or several hours, or a major part of one hour, till the desired structure according to the invention is produced.

Generally, the body according to my invention is consolidated by using auxiliary metals of the kind and in the amounts as mentioned before and sintering it at elevated temperature, e. g. in the range up to about 1400° C. to about 1600° C. until solid solutions or homogeneous carbide crystal structures as hereinbefore defined, are formed.

In case, however, difficult forms of the body are to be produced not achievable by usual moulds, or in case sharp edges are desired, or angles difficult to manufacture in such a way, so that the mechanical working or finishing of the hard metal body is needed after sintering, then the following way is preferable.

The pressed and preformed body is to be subjected to sintering temperatures as mentioned before, but such sintering should be done during a short period of time only, say for 1 to 5 to 10 minutes so that the particles are sufficiently fritted together to withstand mechanical treatment without presenting, however, the hardness of a fully sintered body. Such a body is then subjected to finishing in any way and then the sintering at the same temperature is continued until the sintered body answering the invention is achieved.

When I refer in the appended claims to carbide of elements selected from the third, fourth, fifth and sixth group of the periodic system, I mean carbides capable of forming solid solutions in substantial amounts at the temperatures stated and adapted for use in hard tool elements, having a suitable hardness and not being dissolved by water or other liquid employed for cooling or similar purposes at operation temperatures. Such carbides are boron-carbide (belonging to the third group), titanium-carbide (belonging to the fourth group), vanadium-carbide, columbium carbide, tantalum-carbide (belonging to the fifth group), and tungsten-carbide, molybdenum-carbide (belonging to the sixth group).

Tool alloys prepared according to the invention are, as a rule, not used for the production of the entire tool, but merely for the part of the tool which in practice is used directly for cutting, drilling, etc. and which is subject to wear.

From the above description it appears that the carbides are compounded entirely or in substantial amount into solid solutions or homogeneous carbide crystal structures as hereinbefore defined, in the presence of auxiliary metal essentially of the iron group and by heat treatment to sufficient extent, while cementing of the composition is effected.

It has been found that homogeneous carbide crystal structures or solid solutions resist recrystallization to a great extent. Fine grain of carbides present in the alloy including those structures and their as uniform as possible distribution in the completed body is substantially retained, and a substantially dense and tough and very efficient, clean cutting material is obtained.

If carbides highly resistant to oxidation and other carbides less resistant to oxidation are thus compounded according to the invention into solid solutions or homogeneous carbide crystal structures as hereinbefore defined, the resistivity of those structures against oxidation surpasses that of the carbide of originally lower resistivity.

This is in conformity with the theory applying to solid solutions, of substances of different resistance against corrosion where the substance of greater resistance protects that of lower resistance (Jeffries and Archer, "The Science of Metals," 1924, p. 261). Also according to the theory applying to solid solutions, the heat conductivity of one substance to which another is added in solid solution is considerably lowered (Jeffries and Archer, ibid., pp. 246, 247 and Hume-Rothery, "The Metallic State," p. 85 to 87).

What I claim is:

1. In a method of producing a hard metal alloy, in particular for tool elements and other working appliances, the steps of comminuting as finely as possible at least two hard carbides of different elements other than carbon selected from the third through sixth group of the periodic system, admixing said comminuted carbide in substantial amounts, including a minimum of 1% of a selected carbide, with auxiliary metal essentially of the iron group in amounts of about 3% to 22%, shaping said mixture and finally alloying it by sintering into a hard and tough body and until solid solutions of said selected carbides are formed therein in substantial amount.

2. In a method of producing a hard metal composition, in particular for tool elements and other working appliances, the steps of finely comminuting at least two hard carbides of different elements other than carbon selected from the third through sixth group of the periodic system, admixing said comminuted carbides in substantial amounts, including a minimum of 1% of a selected carbide, with auxiliary metal essentially of the iron group in amounts of about 3% to 22%, shaping and pressing said mixture and finally alloying it by sintering into a hard and solid body and until solid solutions of said selected carbides are formed therein in substantial amount, about 10% by weight of the final body as minimum.

3. In a method of producing a hard metal alloy, in particular for tool elements and other working appliances, the steps of comminuting as finely as possible at least two hard carbides of different elements other than carbon selected from the third, fourth, fifth and sixth group of the periodic system, admixing said comminuted carbides in substantial amounts, including a minimum of 1% of a selected carbide, with auxiliary metal essentially of the iron group in amounts of about 3% to 22%, shaping said mixture under pressure and finally alloying it by sintering into a hard and tough body and until solid solutions of said selected carbides are formed in substantial amount and increase thereby the average hardness of the alloy.

4. In a method of producing a hard metal composition, particularly for tool elements and other working appliances, the steps of selecting and finely comminuting at least two hard carbide crystal structures formed from carbon and different elements other than carbon belonging to at least two different groups of the periodic system and selected from the third through sixth group thereof, admixing the comminuted carbide structures in substantial amounts, including a minimum of about 1% of a selected carbide structure, with auxiliary metal essentially of the iron group in amounts of about 3% to 22%, shaping said mixture under pressure and finally compounding it by sintering at temperatures between about 1400° and about 1600° C. until a hard and tough body and substantial amounts, about 10% by weight of the final body as a minimum, of homogeneous carbide crystal structures are obtained therein containing atoms of at least two elements selected from said groups in addition to carbon atoms.

5. In a method of producing a hard metal composition, particularly for tool elements and other working appliances, the steps of selecting and comminuting as finely as possible at least two carbide crystal structures formed from carbon and different elements selected from the group consisting of boron, titanium, vanadium, columbium, tantalum, tungsten, molybdenum, admixing the comminuted carbide structures in substantial amounts, including a minimum of about 1% of a selected carbide structure, with auxiliary metal essentially of the iron group in amounts of about 3% to 22%, shaping said mixture and finally compounding it by sintering at temperatures between about 1400° and about 1600° C. until a hard and tough body and substantial amounts of homogeneous carbide crystal structures are obtained therein containing atoms of at least two elements selected from said group in addition to carbon atoms, and the average hardness of the composition is increased thereby.

6. In a method of producing a hard metal composition, in particular for tool elements and working appliances, the steps of finely comminuting a carbide crystal structure containing titanium in addition to carbon and another carbide crystal structure containing tungsten in addition to carbon, admixing said comminuted carbide structures in substantial amounts, including a minimum of 1% of a carbide structure, with auxiliary metal essentially of the iron group in amounts of about 3% to 22%, shaping said mixture and finally compounding it by sintering into a hard and tough body until substantial amounts, about 10% by weight of the final body as a minimum of homogeneous carbide crystal structures are obtained therein, containing atoms of titanium and tungsten in addition to carbon atoms.

7. In a method of producing a hard metal alloy, in particular for tool elements and working appliances, the steps of comminuting as finely as possible at least two hard carbides of different elements other than carbon belonging to at least two different groups of the periodic system and selected from the third through sixth group thereof, admixing said comminuted carbides in substantial amounts, including a minimum of 1% of a selected carbide, and in proportions suitable to yield approximately hardest homogeneous carbide crystal structures containing atoms of at least two elements selected from said groups in addition to carbon atoms, with auxiliary metal essentially of the iron group in amounts of about 3% to 22%, shaping said mixture and finally alloying it by sintering into a hard and tough body and until said crystal structures are formed in substantial amount.

8. In a method of producing a hard metal alloy, for tools and other working appliances, the steps of intimately and uniformly admixing at least two different hard carbide crystal structures formed from carbon and at least two elements selected from the group consisting of boron, titanium, vanadium, tantalum, columbium, tungsten and molybdenum, with auxiliary metal essentially of the iron group, so that a finely divided mixture substantially comprised of said carbide crystal structures and about 3% to 22% of said auxiliary metal is obtained, shaping under pressure and finally sintering said mixture at about 1400° C. to about 1600° C. until a hard and tough body and substantial amounts, about 10% of weight of the final body as a minimum, of carbide crystal structures homogeneously containing atoms of at least two elements selected from said group in addition to carbon atoms, are obtained during final sintering.

PAUL SCHWARZKOPF.